Figure 1:
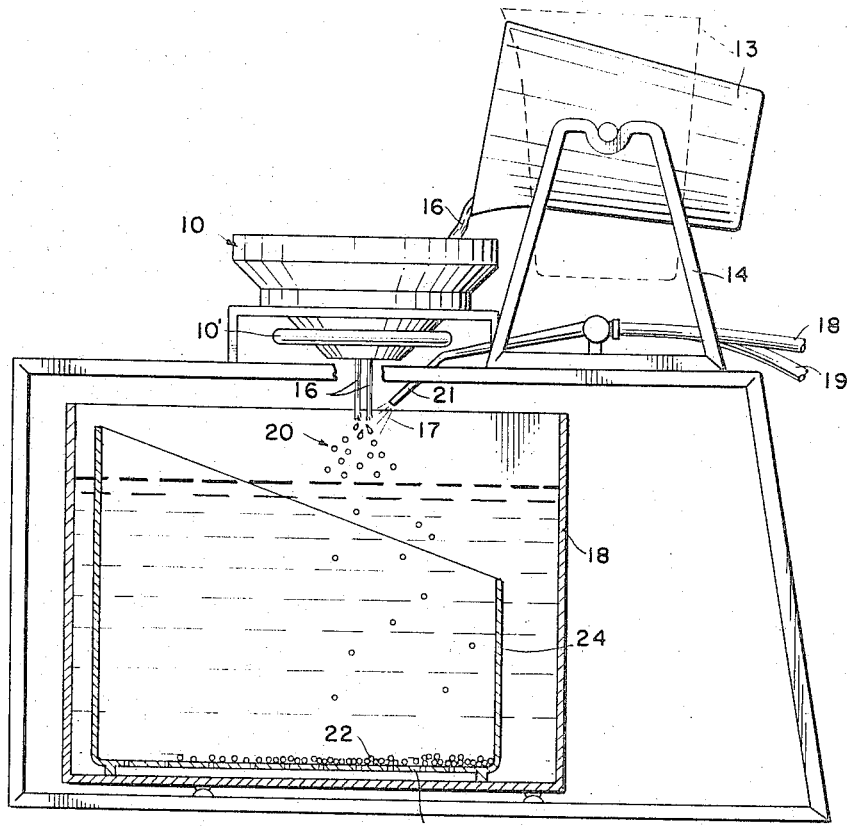

May 9, 1967  F. O. HAARBYE  3,317,991
METHOD OF FABRICATING PREOXIDIZED SILVER-CADMIUM
OXIDE ELECTRICAL CONTACTS
Filed April 2, 1965  3 Sheets-Sheet 1

INVENTOR
FREDRIK O. HAARBYE
BY
ATTORNEY

EFFECT OF COLD WORK ON PHYSICAL PROPERTIES OF PRE-OXIDIZED MATERIAL

United States Patent Office 3,317,991
Patented May 9, 1967

3,317,991
METHOD OF FABRICATING PREOXIDIZED
SILVER-CADMIUM OXIDE ELECTRICAL
CONTACTS
Fredrik O. Haarbye, Indianapolis, Ind., assignor to P. R.
Mallory & Co. Inc., Indianapolis, Ind., a corporation
of Delaware
Filed Apr. 2, 1965, Ser. No. 445,038
7 Claims. (Cl. 29—420.5)

The present invention relates generally to the fabrication of wire and strip material and more particularly relates to means and methods for the fabrication of preoxidized silver-cadmium oxide materials for use in electrical contacts.

Preoxidized silver-cadmium oxide wire and strip may be fabricated by any one of the following three basically different procedures:

(a) Manufacture from silver and cadmium oxide powders.
(b) Manufacture from internally oxidized silver-cadmium shot or grain.
(c) Manufacture by internally oxidizing silver-cadmium wire or strip prior to manufacture of the final part.

The manufacture of silver-cadmium oxide wire from silver and cadmium oxide powders is expensive due to the high powder cost and very limited workability. Several attempts have been made to oxidize silver-cadmium alloy wire. However, no practical method has yet been devised for production of wire with the required ductility. Although preoxidized wire has become available within the last several years, it is only recently that the wire quality has been satisfactory for general heading applications.

The present invention discloses a unique method for the manufacture of preoxidized wire and strip comprising the steps of casting the silver-cadmium shot, internally oxidizing said shot, compacting the oxidized shot, extruding the compacted shot, and cold working the extruded shape to final size.

It is an object of the present invention, therefore, to provide a superior method of fabricating electrical contact material wherein silver-cadmium shot is internally oxidized.

It is another object of the present invention to disclose a manufacturing method which is economically superior to the use of silver and cadmium oxide powders because of the lower cost of the base materials.

Still another object of the present invention is to disclose a manufacturing method which is superior to the use of silver and cadmium oxide powders because of higher density, better conductivity, and greater workability in the finished material.

Yet another object of the present invention is to disclose a method of manufacturing preoxidized silver-cadmium oxide materials which is superior to the use of post-oxidized materials because of shorter fabrication time, harder contact surface, less scrap of the expensive formed contact part, and better dimensional control of the finished part.

Still another object of the present invention is to disclose a method of manufacturing preoxidized silver-cadmium oxide materials which avoids a center core of unoxidized material or a cadmium depleted center core and requires no sorting of the contact parts due to oxidation defects.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

Figure 2:
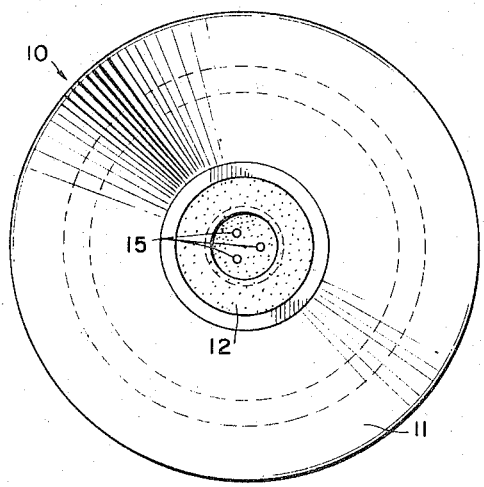
Figure 3:
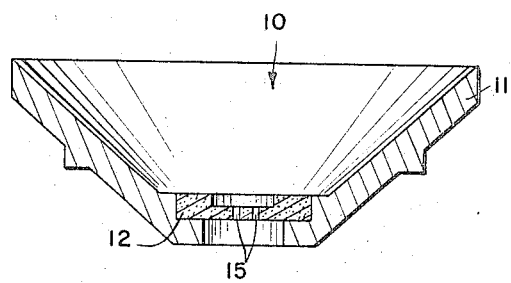
Figure 4:
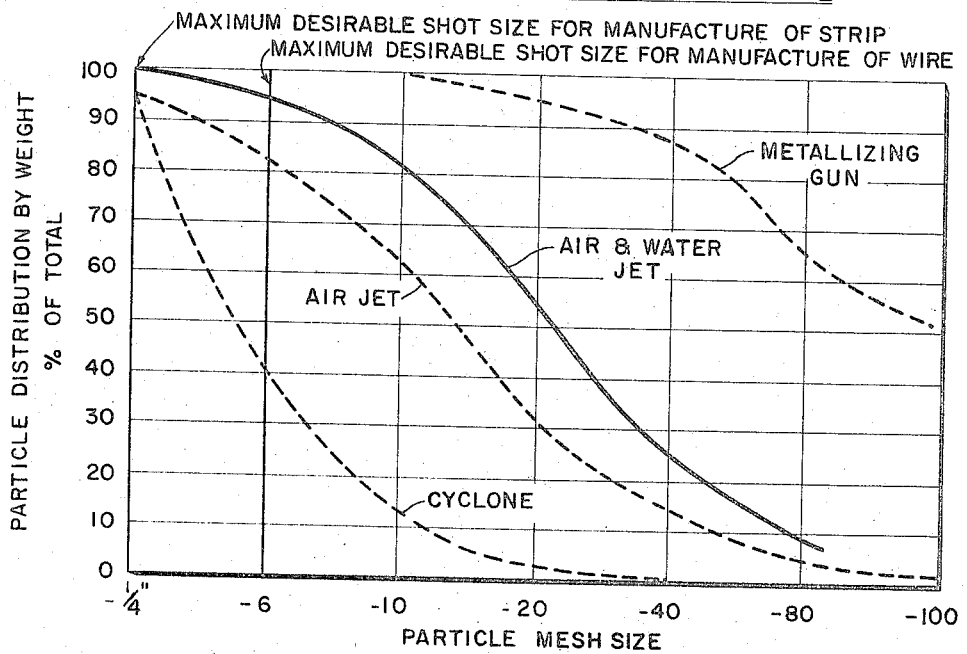
Figure 5:
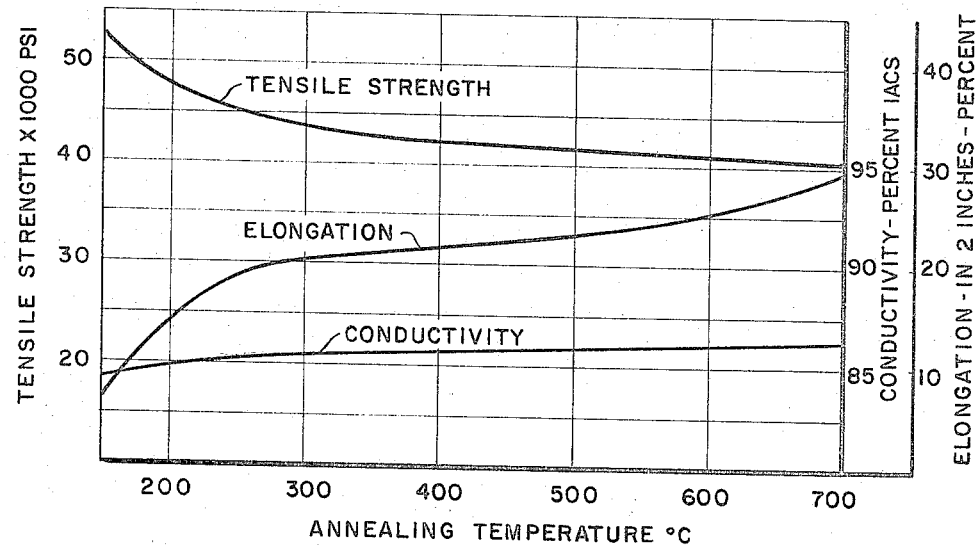
Figure 6:
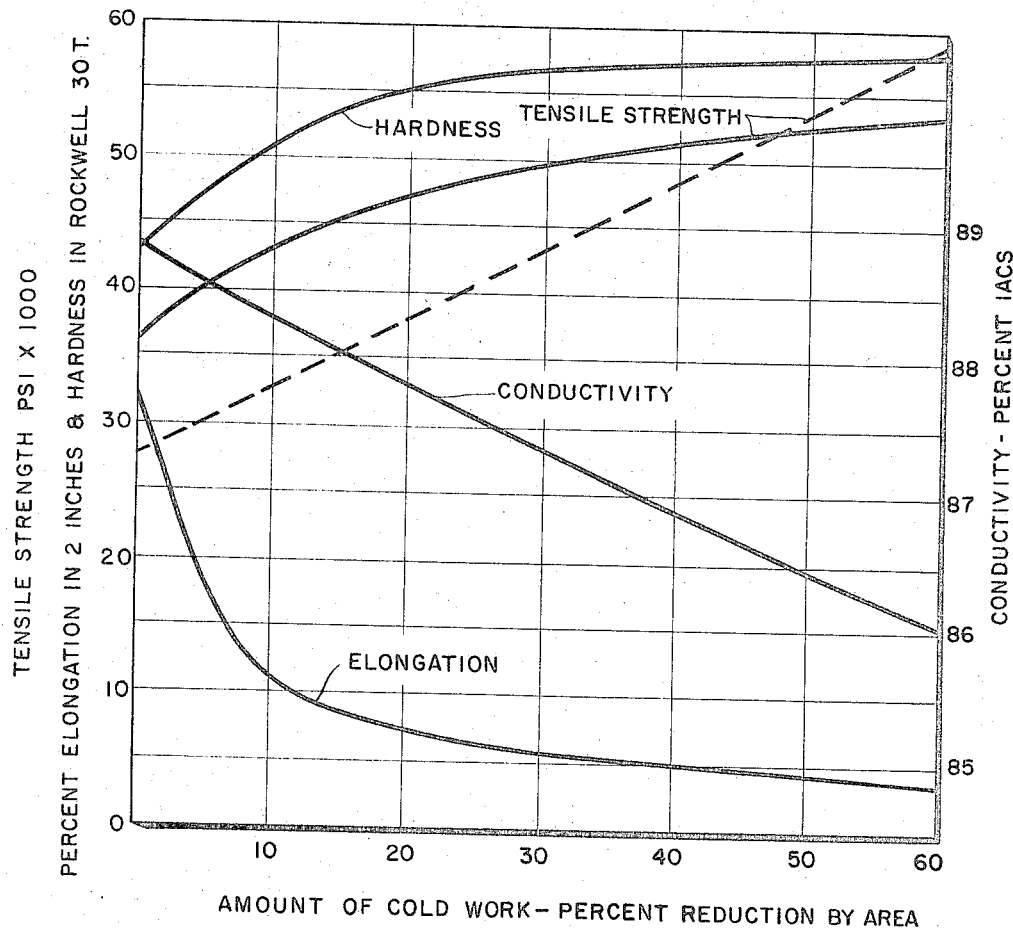

For illustrative purposes, the invention will be described in conjunction with the accompanying drawings in which:

FIGURE 1 is a cross-sectional view of the casting assembly construction;
FIGURE 2 is a sectional view of the funnel;
FIGURE 3 is a top view of the funnel;
FIGURE 4 is a graph showing the effect of the shotting method on shot size;
FIGURE 5 is a graph indicating the recovery rate of a completely soft condition is very slow; and
FIGURE 6 is a graph showing the effect of cold work on preoxidized material and on the same material prior to oxidation.

Referring now to the process encompassed by the present invention, the first step under consideration is the casting of silver-cadmium shot.

Disintegration of molten metal has long been a convenient technique for producing small metal particles or shot. Numerous patents have disclosed methods for atomization of a molten metal stream ejecting from an orifice with the use of jets of different media to aid in breaking up the stream. The factors determining the breaking-up process of the molten stream are quite complicated. After the liquid stream breaks up into fragments through friction and resistance to the atmosphere, these fragments tend to contract to droplet form due to the surface tension of the metal. The size of the drop is largely dependent upon the size of the liquid stream and the viscosity of the molten metal.

Fine silver readily lends itself to fragmentation into small particles by shotting. However, the addition of cadmium to the silver drastically changes the surface tension of the liquid alloy to the point where single shotting is not feasible. Although several approaches are available in the shotting operation for silver-cadmium alloys, the most desirable one for the present invention employs the atomization of a liquid silver-cadium metal stream using a direct air or air-water nozzle. The shotting device consists of three general parts: the funnel establishing the size of the molten metal stream, the nozzle producing the jet which breaks up the liquid metal stream into small fragments, and a collector to contain the shot or grain.

The most practical construction arrived at for the shotting funnel is illustrated in FIGURES 2 and 3. Funnel 10 consists of a cast iron cone 11 with a graphite insert 12. Liquid metal prepared according to the standard melting procedure and superheated to a temperature of 1260° C. in crucible 13 is poured into funnel 11. Crucible 13 is pivotally mounted in bracket 14 to facilitate pouring. In order to shorten the pour time and prevent excessive cooling of the molten metal during the shotting operation, one or more holes 15 are drilled in the center of graphite insert 12, thus forming one or more metal streams 16, each having a diameter of approximately 0.095 inch. The molten streams 16 emerging from funnel 10 are subjected to a jet 17 of air or an air-water mixture. Shop air and water at regular pressures are employed and are introduced from inlets 18 and 19 respectively. The disintegrated streams 20 fan out from nozzle 21, and the metal shot 22 is collected and cooled in a metal drum 23 containing water. Drum 23 has an inner drum 24 for the actual collection of the shot. After cooling, the cooling water is drained from the shot and the shot is allowed to air dry. When completely dry the shot is screened through a No. 6 mesh screen in the case of wire, or a ¼ inch screen for strip applications.

The next step in the process of the present invention comprises internal oxidation of the silver-cadmium shot. The dried and screened shot is loaded in shallow Inconel trays perforated on the bottom with .064 inch diameter holes for air circulation. Loading depth of the grain is approximately ½ inch. Each tray holds approximately 150 troy ounces, and a typical oxidizing furnace can accommodate 16 trays, or a total charge of 2400 troy ounces.

Oxidation is carried out at the standard oxidizing temperature for silver-cadmium oxide material, size 825° C. The furnacing cycle in air is 24 hours. In an oxygen-enriched atmosphere, i.e., by introducing oxygen into the furnace at the rate of 50 cubic feet per hour, the furnacing cycle is reduced to 5 hours. Cleaning of the oxidized shot is normally not necessary unless an excessive amount of cadmium oxide is present on the surface of the shot. If the cleaning is needed, a 5-minute rinse in 5% solution of $H_2SO_4$, followed by a thorough rinse in clean water, is recommended.

The third step in the instant process comprises the compacting of the oxidized silver-cadmium shot. The grain may be prepared for extrusion by one of the following three methods:

(a) Compacting the shot in the extrusion press container immediately prior to the extrusion.

(b) Compacting the shot into billet form by hydrostatic pressing.

(c) Compacting the shot into billet form by mechanical pressing.

In the fourth step herein, the compacted grain or shot is extruded. Immediately prior to extrusion, the compacted grain is pre-heated to a temperature of 1450° F. Air is used as the furnace atmosphere. Due to the high strength of the preoxidized material, an effective extrusion pressure of approximately 80 tons per sq. in. is required, and the billets are reverse extruded.

The fifth and final step of the present invention involves cold working the extruded shape to final size. This can be accomplished by conventional techniques.

The manufacture of preoxidized material from a disintegrated silver-cadmium alloy having the necessary formability requires a close control of each step throughout the entire process.

It has been established that the maximum shot particle size desirable for the manufacture of wire is approximately 0.132 in. or a particle size which will pass through a No. 6 mesh screen. When larger shot sizes are used, a pronounced woody structure is obtained. FIGURE 4 shows the effect of the shotting methods on shot sizes. The shotting arrangement as shown in FIGURE 1 (1) minimizes the problems associated with a too rapid cooling of the liquid metal prior to passing through the small orifice; (2) prevents the flux from entering the funnel orifice and contaminating the shot; (3) increases the ease of cleaning the funnel after pour is finished; (4) prevents agglomeration by welding of the hot shot in the collector; and (5) provides for ease of removal of the shot from the collector.

The importance of preventing flux or contamination from being mixed in with the shot cannot be overemphasized. Any foreign material mixed in with the shot will seriously impede both the drawability as well as the headability of the material.

Drying of the shot is best accomplished at room temperature and spread out in a layer of about one inch thick on paper having good absorption characteristics. This minimizes the impurities transferred onto the shot from salts dissolved in the water.

Although diffusion furnaces used for batch diffusion of headed contact rivets are satisfactory for oxidation of shot, a slight stirring action is desirable to prevent formation of surface cadmium oxide by providing easy access of the furnace atmosphere to the entire shot mass, and to prevent fusion of the shot during oxidation.

FIGURE 5 indicates that the recovery rate of a completely soft condition upon annealing is very slow, and is not complete at a temperature below 700° C.

FIGURE 6 shows that the effect of cold work on preoxidized material (solid line) is not as pronounced as the effect of cold work on the same material (dotted line) prior to oxidation. However, the dispersion of fine particles of cadmium oxide throughout the silver matrix of preoxidized material considerably increases the strength of the material in the soft condition as compared with the original silver-cadmium material. Due to the small amount of cold work desirable between anneals, the extruded size should be as close to the final size as possible.

The present invention as hereinabove described and in its representative embodiment is merely illustrative and not exhaustive in scope. Since many widely differing embodiments of the invention may be made without departing from the scope thereof, it is intended that all matters contained in the above description and shown in the accompanying drawing shall be interpreted as illustrative and not in a limiting sense.

Having thus described my invention, I claim:

1. The method of manufacturing preoxidized silver-cadmium oxide materials comprising the steps of:
   (a) supherheating a molten metal, consisting of silver and cadmium, to be atomized;
   (b) pouring said molten metal into means for producing a plurality of spaced apart molten streams;
   (c) subjecting said molten streams to an air-water jet, said jet breaking up said molten metal streams into small fragments;
   (d) collecting and cooling the resulting silver-cadmium shot;
   (e) air drying said shot and screening said shot for size;
   (f) oxidizing said shot;
   (g) compacting said shot;
   (h) extruding said shot;
   (i) and cold working said extruded shot to final shape.

2. The method of manufacturing preoxidized silver-cadmium oxide materials comprising the steps of:
   (a) superheating a molten metal, consisting of silver and cadmium, to be atomized;
   (b) pouring said molten metal into a means for producing a plurality of spaced-apart molten streams;
   (c) subjecting said molten streams to an air jet, said jet breaking up said molten metal streams into small fragments;
   (d) collecting and cooling the resulting silver-cadmium shot;
   (e) air drying said shot and screening said shot for size;
   (f) oxidizing said shot;
   (g) compacting said shot;
   (h) extruding said shot;
   (i) and cold working said extruded shot to final shape.

3. The method of manufacturing preoxidized silver-cadmium oxide materials comprising the steps of:
   (a) superheating a molten metal, consisting of silver and cadmium, to be atomized;
   (b) pouring said molten metal into a cast iron funnel, said funnel having a graphite insert with a plurality of spaced apart apertures, said molten metal leaving said funnel in a plurality of spaced apart streams;
   (c) subjecting said molten streams to an air-water jet, said jet breaking up said molten metal streams into small fragments;
   (d) collecting and cooling the resulting silver-cadmium shot;
   (e) air drying said shot and screening said shot for size;
   (f) oxidizing said shot;
   (g) compacting said shot;

(h) extruding said shot;
(i) and cold working said extruded shot to final shape.

4. The method of manufacturing preoxidized silver-cadmium oxide materials comprising the steps of:
  (a) superheating a molten metal, consisting of silver and cadmium, to be atomized to a temperature of about 1260° C.;
  (b) pouring said molten metal into a cast iron funnel, said funnel having a graphite insert with a plurality of spaced apart apertures, said molten metal leaving said funnel in a plurality of spaced apart streams;
  (c) subjecting said molten streams to an air-water jet, said jet breaking up said molten metal streams into small fragments;
  (d) collecting and cooling the resulting silver-cadmium shot;
  (e) air drying said shot and screening said shot for size;
  (f) oxidizing said shot;
  (g) compacting said shot;
  (h) extruding said shot;
  (i) and cold working said extruded shot to final shape.

5. The method of manufacturing preoxidized silver-cadmium oxide materials comprising the steps of:
  (a) superheating a molten metal, consisting of silver and cadmium, to be atomized to a temperature of about 1260° C.;
  (b) pouring said molten metal into a cast iron funnel, said funnel having a graphite insert with a plurality of spaced apart apertures, said molten metal leaving said funnel in a plurality of spaced apart streams;
  (c) subjecting said molten streams to an air-water jet, said jet breaking up said molten metal streams into small fragments;
  (d) collecting and cooling the resulting silver-cadmium shot;
  (e) air drying said shot and screening said shot for size;
  (f) oxidizing said silver-cadmium shot at a temperature of about 825° C.;
  (g) compacting said shot;
  (h) extruding said shot;
  (i) and cold working said extruded shot to final shape.

6. The method of manufacturing preoxidized silver-cadmium oxide materials comprising the steps of:
  (a) superheating a molten metal, consisting of silver and cadmium, to be atomized to a temperature of about 1260° C.;
  (b) pouring said molten metal into a cast iron funnel, said funnel having a graphite insert with a plurality of spaced apart apertures, said molten metal leaving said funnel in a plurality of spaced apart streams;
  (c) subjecting said molten streams to an air-water jet, said jet breaking up said molten metal streams into small fragments;
  (d) collecting and cooling the resulting silver-cadmium shot;
  (e) air drying said shot and screening said shot for size;
  (f) oxidizing said shot at a temperature of about 825° C. in an oxygen-containing atmosphere for 5–24 hours;
  (g) compacting said shot;
  (h) extruding said shot;
  (i) and cold working said extruded shot to final shape.

7. The method of manufacturing preoxidized silver-cadmium oxide materials comprising the steps of:
  (a) superheating a molten metal, consisting of silver and cadmium, to be atomized to a temperature of about 1260° C.;
  (b) pouring said molten metal into a cast iron funnel, said funnel having a graphite insert with a plurality of spaced apart apertures, said molten metal leaving said funnel in a plurality of spaced apart streams;
  (c) subjecting said molten streams to an air-water jet, said jet breaking up said molten metal streams into small fragments;
  (d) collecting and cooling the resulting silver-cadmium shot;
  (e) air drying said shot and screening said shot for size;
  (f) oxidizing said silver-cadmium shot at a temperature of about 825° C. in an oxygen-containing atmosphere for 5–24 hours;
  (g) compacting said shot;
  (h) extruding said shot at about 80 tons/sq. in.;
  (i) and cold working said extruded shot to final shape.

References Cited by the Examiner

UNITED STATES PATENTS

| | | | |
|---|---|---|---|
| 2,796,346 | 6/1957 | Stumbock | 75—173 |
| 2,894,839 | 7/1959 | Matsukawa | 75—206 X |
| 3,075,281 | 1/1963 | Spooner | 29—420 X |

L. DEWAYNE RUTLEDGE, *Primary Examiner.*

A. J. STEINER, *Assistant Examiner.*

UNITED STATES PATENT OFFICE

Certificate

Patent No. 3,317,991　　　　　　　　　　　　　　　　Patented May 9, 1967

Fredrik O. Haarbye

Application having been made by Fredrik O. Haarbye, the inventor named in the patent above identified, and P. R. Mallory & Co., Inc., Indianapolis, Indiana, a corporation of Delaware, the assignee, for the issuance of a certificate under the provisions of Title 35, Section 256 of the United States Code, adding the name of Peter C. Murphy as a joint inventor, and a showing and proof of facts satisfying the requirements of the said section having been submitted, it is this 12th day of May 1970, certified that the name of the said Peter C. Murphy is hereby added to the said patent as a joint inventor with the said Fredrik O. Haarbye.

[SEAL]

LUTRELLE F. PARKER
*Associate Solicitor.*